US009630452B2

(12) United States Patent
Minowa

(10) Patent No.: US 9,630,452 B2
(45) Date of Patent: Apr. 25, 2017

(54) PNEUMATIC TIRE

(75) Inventor: Hideaki Minowa, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 13/981,653

(22) PCT Filed: Feb. 10, 2012

(86) PCT No.: PCT/JP2012/000918
§ 371 (c)(1),
(2), (4) Date: Jul. 25, 2013

(87) PCT Pub. No.: WO2012/111296
PCT Pub. Date: Aug. 23, 2012

(65) Prior Publication Data
US 2013/0299052 A1 Nov. 14, 2013

(30) Foreign Application Priority Data

Feb. 14, 2011 (JP) .................................. 2011-028933

(51) Int. Cl.
B60C 11/01 (2006.01)
B60C 9/18 (2006.01)
(Continued)

(52) U.S. Cl.
CPC ................ B60C 9/18 (2013.01); B60C 9/185 (2013.01); B60C 9/22 (2013.01); B60C 9/28 (2013.01);
(Continued)

(58) Field of Classification Search
CPC ..... B60C 11/01; B60C 2011/013; B60C 9/22; B60C 9/2204; B60C 9/28; B60C 2009/283; B60C 2009/286; B60C 9/185
(Continued)

(56) References Cited

U.S. PATENT DOCUMENTS 4,671,333 A * 6/1987 Rohde et al. ........ 152/209.16 X
4,741,373 A * 5/1988 Mauk ....................... 152/209.16
(Continued)

FOREIGN PATENT DOCUMENTS

EP 0122530 A2 10/1984
EP 0173101 A2 3/1986
(Continued)

OTHER PUBLICATIONS

English machine translation of JP 2010-208505 A, Sep. 24, 2010.*
(Continued)

Primary Examiner — Adrienne C Johnstone
(74) Attorney, Agent, or Firm — Sughrue Mion, PLLC

(57) ABSTRACT

Provided is a pneumatic tire including: a belt reinforcing layer (12) having an outside end portion in the tire width direction disposed outside in the tire width direction than a tire circumferential groove (16) disposed at the outermost side in the tire width direction, in which a buttress portion (19) being positioned on the outside of a tread (15) in the tire width direction and connecting a surface (15a) of the tread (15) to a sidewall (20) is formed to have, in section in the tire width direction, an outer surface in a concave shape with a depth shallow enough not to be set into the inside in the tire width direction from the outside end of the surface (15a) of the tread (15) in the tire width direction.

4 Claims, 3 Drawing Sheets

(51) Int. Cl.
*B60C 9/22* (2006.01)
*B60C 9/28* (2006.01)

(52) U.S. Cl.
CPC ......... *B60C 11/01* (2013.01); *B60C 2011/013* (2013.04); *B60C 2200/06* (2013.04)

(58) Field of Classification Search
USPC .................... 152/209.16, 531, 533, 538, 532
See application file for complete search history.

(56) References Cited

U.S. PATENT DOCUMENTS

| | | | | |
|---|---|---|---|---|
| 4,962,802 A | * | 10/1990 | Rohde | 152/209.16 X |
| 5,772,810 A | * | 6/1998 | Cluzel | B60C 9/22 152/531 X |
| 2008/0271829 A1 | * | 11/2008 | Kobayashi | |
| 2010/0294410 A1 | * | 11/2010 | Yoshikawa | B60C 9/28 152/538 X |

FOREIGN PATENT DOCUMENTS

| | | | | |
|---|---|---|---|---|
| EP | 2213480 A1 | | 8/2010 | |
| JP | S5839503 A | | 3/1983 | |
| JP | 59-40903 A | | 3/1984 | |
| JP | 03253407 A | * | 11/1991 | |
| JP | H04212603 A | | 8/1992 | |
| JP | H07223408 A | | 8/1995 | |
| JP | 2001301425 A | | 10/2001 | |
| JP | 2002511039 A | | 4/2002 | |
| JP | 3419881 B2 | | 6/2003 | |
| JP | 2005-193865 A | | 7/2005 | |
| JP | 2006193052 A | | 7/2006 | |
| JP | 2007137156 A | | 6/2007 | |
| JP | 2010208505 A | * | 9/2010 | |
| JP | 2010-254205 A | | 11/2010 | |
| WO | WO-98/58810 A1 | * | 12/1988 | |
| WO | 0134412 A2 | | 5/2001 | |
| WO | 2006137536 A1 | | 12/2006 | |
| WO | 2008102667 A1 | | 8/2008 | |
| WO | 2009/154282 A1 | | 12/2009 | |

OTHER PUBLICATIONS

Collins English Dictionary—Complete and Unabridged, HarperCollins Publishers 2003, online definition of "concave".*
International Search Report for PCT/JP2012/000918 dated May 15, 2012.
Communication dated May 12, 2015 from the Japanese Patent Office in counterpart application No. 2012-557822.
Communication dated Feb. 13, 2015, issued by the State Intellectual Property Office of the People's Republic of China in counterpart Application No. 201280008907.1.
Communication dated Sep. 25, 2015, issued by the State Intellectual Property Office of the P.R.C. in corresponding Chinese Application No. 201280008907.1.

* cited by examiner

US 9,630,452 B2

PNEUMATIC TIRE

CROSS REFERENCE TO RELATED APPLICATIONS

This application is a National Stage of International Application No. PCT/JP2012/000918 filed Feb. 10, 2012, claiming priority based on Japanese Patent Application No. 2011-028933 filed Feb. 14, 2011.

TECHNICAL FIELD

The present invention relates to a pneumatic tire, and more particularly to a pneumatic tire including a circumferential direction belt layer and an angled belt layer disposed on the outside of the carcass layer in the tire radial direction, which is for use in a heavy duty vehicles such as trucks and buses.

BACKGROUND ART

There has been conventionally known a tire which includes at least one belt reinforcing layer disposed on the outer circumferential side of the crown region of a carcass which may be radially configured, the belt reinforcing layer being formed of, for example, a cord extending at an angle of 5° or less relative to the tread circumferential direction so as to extend substantially in the tread circumferential direction, to thereby suppress the radial growth of the tire by the belt reinforcing layer.

One of the examples of the aforementioned tire includes a pneumatic tire provided with: a pair of bead cores; a toroidal carcass layer disposed between the pair of bead cores; a circumferential belt layer disposed on the outside of the carcass layer in the tire radial direction; and an inner inclined belt layer and an outer inclined belt layer disposed on the outside of the circumferential belt layer in the tire radial direction (see Patent Literature 1).

Meanwhile, in recent years, along with the increase of low-profile wide tires, it is indispensable to provide a circumferential belt layer as a belt reinforcing layer in view of maintaining the tire shape when filled to an internal pressure.

Further, tires are required to have high durability, in consideration of the yearly increasing load to which the tires are to be subjected.

Further, in the case of a pneumatic tire to be mounted onto a steering shaft, the tire is likely to be subjected partial wear caused in the shoulder end side of the tread by side force (SF) generated due to a slip angle imparted thereto. In view of this, the tire is designed to have a smaller tread width for the purpose of reducing the wear volume, to thereby suppress the partial wear. In a tire with a reduced tread width, a buttress portion connecting the tread to the sidewall is designed to have an inclined structure configured by an inclined plane disposed at a large inclination angle from the outside in the tire radial direction toward the inside thereof in order to ensure an enough distance from the belt end portion of the belt reinforcing layer to the buttress surface, so as to prevent the belt end portion from penetrating the buttress portion due to distortion occurring in the belt end portion.

CITATION LIST

Patent Literature

PTL 1: WO 2009/154282

SUMMARY OF INVENTION

Technical Problem

However, the circumferential belt layer, which has a function of efficiently maintain the tire shape (uniformizing the tire radial growth in the tread portion), hardly exhibits shear stiffness, which necessitates the provision of an angled belt layer in order to obtain sufficient wear resistance performance of a required level. The angled belt layer determines the wear resistance performance of a pneumatic tire. Therefore, the angled belt layer needs to have a certain belt width relative to the tire width, and further, a plurality of the layers needs to be disposed in a crossed arrangement.

Further, the circumferential belt layer also has a function of uniformizing the tread contact pressure when the tire is brought into contact with the ground under load. When the circumferential belt layer is small in belt width, the tread contact pressure becomes high in a region where the circumferential belt layer is present whereas the pressure becomes extremely low on the outside thereof, which causes partial wear in the tread. Therefore, the circumferential belt is required to have a certain belt width with respect to the tire width, and the ratio of the circumferential belt layer width to the tire width (circumferential belt layer width/tire width) increases as the pneumatic tire has a lower profile.

Further, a pneumatic tire to be mounted onto the steering shaft is designed to have a smaller tread width for the purpose of reducing wear volume. For this reason, the tire has a buttress portion designed to have an inclined structure configured by an inclined plane disposed at a large inclination angle from the outside in the tire radial direction toward the inside thereof, so as to prevent the belt end portion from penetrating the buttress portion. However, the buttress portion formed in the aforementioned shape is incapable of avoiding reduction in tread contact pressure on the shoulder end side of the tread. The tread contact pressure on the shoulder end side needs to be high, because reduction in tread contact pressure on the shoulder end side results in reduction of the flow of the tread rubber in the tire circumferential direction on the shoulder end side, which is likely to cause a partial wear of the tread portion in which the wear amount becomes larger on the shoulder end side.

An object of the present invention is to provide a pneumatic tire having a belt layer structure capable of suppressing partial wear in the tread shoulder while simultaneously improving the tire durability performance, and having a buttress shape adapted to the aforementioned belt layer structure.

Solution to Problem

In order to attain the aforementioned object, a pneumatic tire of the present invention includes: at least one belt reinforcing layer disposed on the outside of the carcass in the tire radial direction; at least one or a plurality of inclination belt layers disposed on the outside of the belt reinforcing layer in the tire radial direction; and a plurality of tire circumferential grooves disposed on a tread surface on the outside of the inclination belt layer in the tire radial direction, the grooves being spaced apart from one another in the tire width direction, the belt reinforcing layer having a belt width that is 70% or more and 95% or less of the tire maximum width in section in the tire width direction, and having an outside end portion in the tire width direction disposed on the outside in the tire width direction than the tire circumferential groove disposed at the outermost side in the tire width direction, the pneumatic tire having a feature in that the buttress portion being positioned on the outside of the tread in the tire width direction and connecting the tread surface to a sidewall is formed to have, in section in the tire width direction, an outer surface in a concave shape with a depth shallow enough not to be set into the inside in the tire width direction from the outside end of the tread surface in the tire width direction.

Further, a pneumatic tire according to another embodiment of the present invention has a feature in that the outer surface of the buttress portion is formed to be in a shape having an inclination angle of 75 degrees or larger and 90 degrees or smaller relative to the tread surface, in section in the tire width direction.

Still further, a pneumatic tire according to further another embodiment of the present invention has a feature in that the shortest distance between an inclined belt layer largest in width among the at least one or the plurality of inclined belt layers and the outer surface of the buttress portion is 10 mm or more and 20 mm or less.

Furthermore, a pneumatic tire according to still further embodiment of the present invention has a feature in that a distance between the outside end in the tire width direction of the tread surface and a belt end portion of the belt reinforcing layer is 0 mm or more and 25 mm or less.

Yet further, a pneumatic tire according to still further embodiment of the present invention has a feature in that the belt reinforcing layer has, at the belt end portion thereof, an interlayer thickness of at least 3.0 mm.

Advantageous Effect of Invention

The pneumatic tire according to the present invention has a buttress portion disposed on the outside in the tire width direction of the tread and connects the tread surface to the sidewall, the buttress portion having an outer surface formed in a concave shape in section in the tire width direction with a depth shallow enough not to be set into the inside in the tire width direction from the outside end of the tread surface in the tire width direction, which allows for proper handling of a tread separation failure that otherwise occurs when the belt reinforcing layer is increased in width, and of the generation of partial wear resulting from side force (SF) imparted when the tire is mounted onto a steering shaft, and also allow the tire to be used until the tread is completely worn out.

Further, in a pneumatic tire according to another aspect of the present invention, the outer surface of the buttress portion is formed to be in a shape having an inclination angle of 75 degrees or larger and 90 degrees or smaller relative to the tread surface, in section in the tire width direction, which suppresses reduction in contact pressure at the tread end, making the tread less susceptible to partial wear, to thereby improve the partial wear resistance of the tread.

Furthermore, in a pneumatic tire according to another aspect of the present invention, the shortest distance between the inclined belt layer having a largest width among the inclined belt layers and the outer surface of the buttress portion is 10 mm or more and 20 mm or less, which makes it possible to ensure a rubber gauge of a required level at the belt end portion while reducing the compressive elasticity modulus.

Still further, in a pneumatic tire according to another aspect of the present invention, the shortest distance between the outside end in the tire width direction of the tread surface and a belt end portion of the belt reinforcing layer is 0 mm or more and 25 mm or less, which reduces the compressive elasticity modulus while ensuring the distance between the belt end portion of an inclined belt layer having a largest belt width and the outer surface of the buttress portion.

Further, in a pneumatic tire according to another aspect of the present invention, the belt reinforcing layer has, at the belt end portion thereof, an interlayer thickness of at least 3.0 mm, so that it is possible to prevent a large interlayer shear distortion which may likely to occur in the belt end portion of the belt reinforcing layer due to tire deformation caused when the tire is brought into contact with the ground under load in a case where the belt width of the belt reinforcing layer is larger than 70% of the tire width.

BRIEF DESCRIPTION OF DRAWINGS

The present invention will be further described below with reference to the accompanying drawings, wherein.

DESCRIPTION OF EMBODIMENTS

Hereinafter, embodiments for implementing the present invention are described with reference to the accompanying drawings.

Figure 1:
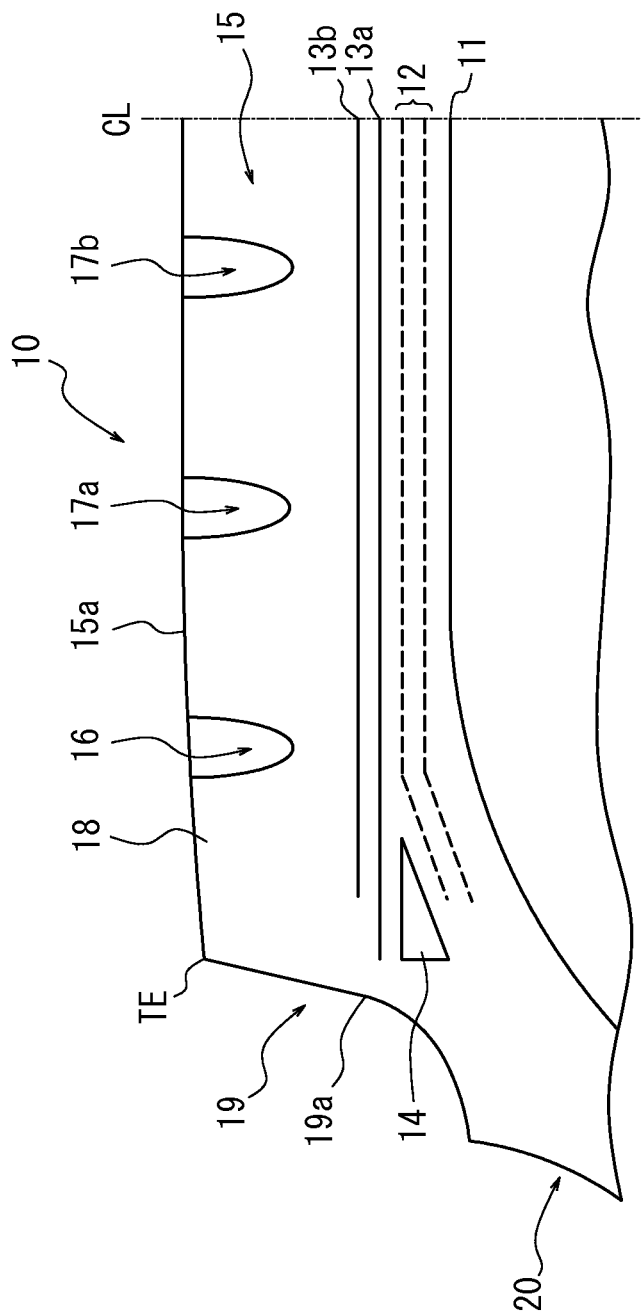
FIG. 1 is a sectional view schematically illustrating an internal structure of a pneumatic tire according to an embodiment of the present invention, the tire being illustrated by the half-width along the tread width direction.

FIG. 1 is a sectional view schematically illustrating an internal structure of a pneumatic tire according to an embodiment of the present invention, the tire being illustrated by the half-width along the tread width direction. In the following description, only one end of the tire in the tire width direction illustrated by the half-width thereof is described, assuming that the other end of the tire in the tire width direction is similarly configured, and the description thereof is omitted.

As illustrated in FIG. 1, a pneumatic tire 10 includes a carcass 11 formed of, for example, one carcass ply toroidally extending across a pair of bead portions (not shown), and may be formed in a radial configuration.

Belt reinforcing layers (circumferential belt layers) 12 in a two-layered structure are disposed on the outer circumference side, that is, on the outside in the tire radial direction of the carcass 11, in a crown region where the tread is formed. The belt reinforcing layers 12 each may be formed of a cord that extends at an angle of 5 degree or less with respect to the tread circumferential direction, the cord being formed of a ribbon-like strip spirally wound around the tire shaft, the strip having a width of 3 mm or more and 20 mm or less obtained by rubber-coating a plurality of parallely-arranged cords. Here, the number of the belt reinforcing layers 12 is not limited to two, as long as at least one of the layers is provided.

The belt reinforcing layers 12 each may be formed of a cord with so-called high initial elongation, which greatly elongated by a small tensional force until the elongation ratio of the cord reaches a range of 2% but has a smaller elongation ratio even by a large tensional force once exceeding the range thereof. Examples of such cord include: Lang's lay steel cord; a high elongation steel cord; and an organic fiber cord, and may also be formed of a steel cord that extends in a winding manner, such as in a zig-zag manner, in a cranked manner, or in a waved manner, or a steel cord that extends in a linear manner, with respect to the tread circumferential direction.

In the case of extending the cord forming the belt reinforcing layers 12 in a winding manner such as in a zig-zag manner to ensure the initial elongation of the cord, it is preferred to have the winding form disappeared as being offset when the tire assembled to a rim is filled to a maximum air pressure defined in YEAR BOOK or the like stipulated by, for example, JATMA (The Japan Automobile Tyre Manufacturers Association, Inc.), TRA (The Tire and Rim Association, Inc.), and ETRTO (European Tyre and Rim Technical Organization), in order for the belt reinforcing layers to fully exert the function of suppressing the diameter growth of the pneumatic tire in the use state. This configuration allows the belt reinforcing layers to fully exert the function of suppressing the diameter growth of the tire.

The belt reinforcing layer 12 has a belt width that corresponds to a length accounting for 70% or more and 95% or less, preferably, 75% or more and 95% or less of a tire width direction length, in section in the tire width direction, of a tire which is filled to a normal internal pressure and in contact with the ground.

Here, the normal internal pressure is an air pressure specified for each tire size by various standards on tires, and specifically refers to the highest air pressure stipulated by JATMA, the maximum value described in Table of "TIRE LOAD LIMITS AT VARIOUS COLD INFLATION PRESSURES" stipulated by TRA, and the "INFLATION PRESSURE" stipulated by ETRTO.

Disposed on the outside in the tire radial direction of the belt reinforcing layers 12 are an inclined belt layer 13a (first angled belt layer) and an inclined belt layer 13b (second angled belt layer), each being formed of a cord extending at an inclination angle of, for example, 40 degrees or more and 60 degrees or less with respect to the tread circumferential direction. The two-layered inclined belt layers 13a, 13b are stacked in such a manner that the cords forming the layers extend in mutually opposite directions with respect to the tread circumferential direction and intersect with each other between the upper and lower layers. The number of the inclined belt layers is not limited to two, as long as at least one of the layers is provided.

Of the two-layered inclined belt layers 13a, 13b, the inclined belt layer 13a that is larger in belt width, i.e., in length in the tire width direction, is positioned as an inner layer adjacent to the belt reinforcing layers 12 and the inclined belt layer 13b is positioned as an outer layer of the inclined belt layer 13a, in which the belt width of the inclined belt layer 13a is defined so as not to fall short of the belt width of the belt reinforcing layers 12 and the belt width of the inclined belt layer 13b is defined so as not to exceed the belt width of the belt reinforcing layers 12 (see FIG. 1). In other words, at least one of the two-layered inclined belt layers 13a, 13b is formed to have a belt width larger than those of the belt reinforcing layers 12. Then, the belt end portion of the inclined belt layer 13a lies inside in the tire width direction by a distance of 5 mm or more and 30 mm or less from the belt end portion of the inclined belt layer 13b.

In section in the tire width direction (see FIG. 1), an interlayer rubber 14 is disposed between the belt reinforcing layers 12 linearly extending in the tire width direction and the inclined belt layer 13a extending along the carcass 11 (that is, the inclined belt layer wider than the belt reinforcing layers 12 and widest among those of the inclined belt layers).

The interlayer rubber 14 is formed of a rubber member having a modulus (Mod.) at 100% elongation at a temperature of 25° C. falling within a range of 1.5 MPa or more and 5.0 MPa or less, for example, a modulus of 5.0 MPa or less, when measured in a way that conforms to JIS K6251 standards. The interlayer rubber 14 is disposed in a region of the belt outside end portion between the belt reinforcing layer 12 and the inclined belt layer 13a. The interlayer rubber 14 is formed to have a wedge-shaped section along the tire width direction on the belt reinforcing layer 12 side, that is, on the inside in the tire radial direction, the wedge-shaped section being defined by an inclined plane having an interlayer thickness (gauge: Ga.) increasing from the center side to the end side in the tire width direction, so as to ensure that the belt reinforcing layer 12 is provided with a maximum interlayer thickness (interlayer thickness at the belt outside end portion) of at least 3.0 mm.

Disposed on the outside in the tire radial direction of the inclined belt layers 13a, 13b is a tread rubber forming a tread 15 with a surface thereof serving as a tire contact surface. In the tread 15, six circumferential grooves are formed in total, including, for example, two circumferential grooves (shoulder circumferential grooves) 16 disposed on the outside in the tread width direction and four circumferential grooves (tread circumferential grooves) 17a, 17b disposed inside in the tread width direction, the grooves being spaced apart from one another in the tire width direction, with the result that seven rows of land portions are defined in the tread 15 (see FIG. 1).

Therefore, in the pneumatic tire 10, a tread shoulder land portion 18 is defined in the tread 15 by the shoulder circumferential groove 16 which is disposed on the outermost side in the tread width direction and continuously extends in the tread circumferential direction, the tread shoulder land portion 18 being positioned on the outside end portion in the tread width direction across the outermost end position of the belt reinforcing layer 12. In other words, the belt reinforcing layers 12 each have the end portion in the tire width direction positioned outside in the tire width direction than the shoulder circumferential grooves 16 which are the tire circumferential grooves formed on the outermost sides in the tread width direction in the tread 15.

The tread shoulder land portion 18 has a surface formed of an inclined plane, possibly a curved plane, gradually ascending from the tread shoulder side toward the tread center side, so as to form a tire contact surface. The belt outside end portions of the inclined belt layers 13a, 13b reach into the inside in the tire radial direction of the tread shoulder land portion 18 to overlap the tread shoulder land portion 18.

Meanwhile, in a pneumatic tire of this type, the belt reinforcing layer 12 may preferably be disposed, regardless of the number of layers thereof, such that the outermost edge thereof in the tread width direction is positioned outside in a tread width direction than a position that allows the tire radial growth ratio of the tire to be A % as will be described later when the product tire is assembled to a rim and filled to the maximum air pressure defined in YEAR BOOK stipulated by, for example, JATMA, TRA, and ETRTO. Here, A % refers to a tire radial growth rate, which is associated with the elongation ratio (%) of the cord forming the belt reinforcing layer 12, the elongation rate being obtained when the cord is subjected to tension test and exhibits the elasticity modulus that is 10% of the breaking modulus E1.

The tread end TE, which is the outside edge of the tread shoulder land portion 18 in the tire width direction, is connected to a sidewall 20 via a buttress portion 19. The buttress portion 19 is formed in a J shape in section in the tire width direction so as to extend substantially linearly from the tread end TE toward the inside of the tire radial direction and then curve in an arc shape to the outside in the tire width direction before connecting to the sidewall 20. The buttress portion 19 is defined, with respect to the tire radial direction, as an area between the tread end TE and an innermost position of the inclined belt layer in the tire radial direction.

Specifically, the buttress portion 19 being positioned on the outside in the tire width direction of the tread 15 and connecting the surface 15a of the tread 15 to the sidewall 20 is formed to have an outer surface in a concave shape in section in the tire width direction with a depth shallow enough not to be set into the inside in the tire width direction from the outside end (tread end TE) of the surface 15a of the tread 15 in the tire width direction (see FIGS. 1 and 2), and has an inclined plane structure described in below. Here, when the buttress portion 19 is formed in the concave shape that is shallow enough not to be set into the inside in the tire width direction, it means that a buttress portion outer surface 19a is (entirely) disposed inside than a straight line e to be described later (see FIG. 2) in the tire width direction.

Figure 2:
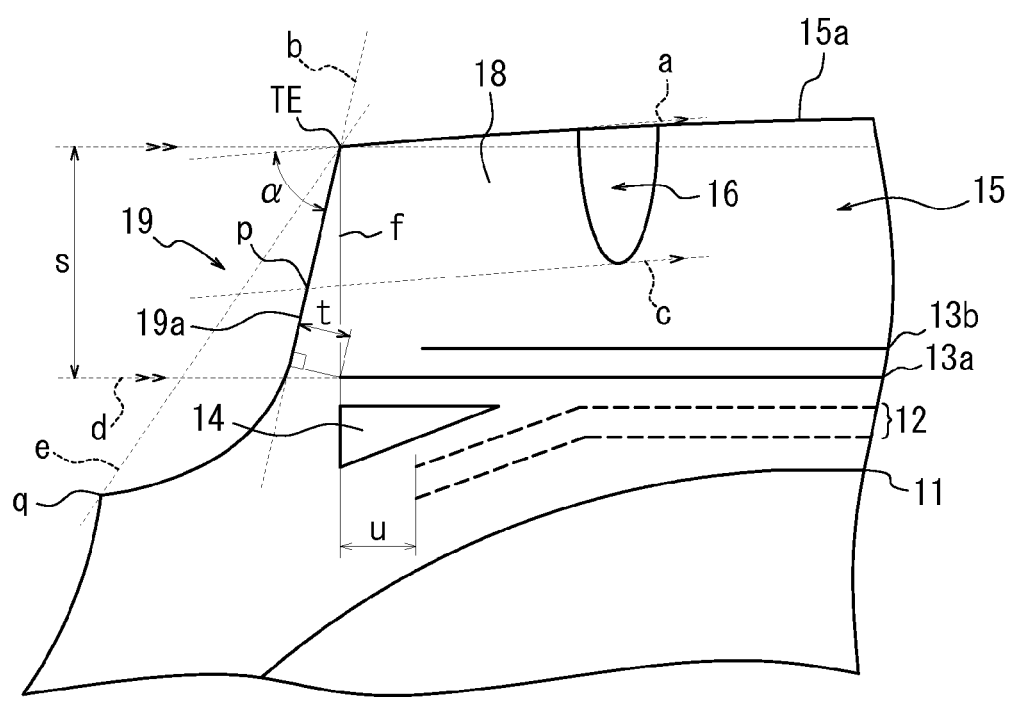
FIG. 2 is a sectional view illustrating an inclined plane structure of the buttress portion of FIG. 1, the tire being illustrated by the half-width along the tread width direction similarly to FIG. 1.

FIG. 2 is a sectional view illustrating an inclined plane structure of a buttress portion of FIG. 1, the tire being illustrated by the half-width along the tread width direction similarly to FIG. 1. As illustrated in FIG. 2, a buttress portion 19 is formed to have a buttress portion outer surface 19a at an inclination angle α that is an angle α formed between a straight line a passing through the tread end TE and a straight line b extending along the buttress portion outer surface 19a, the inclination angle α being defined as 75 degrees or larger and 90 degrees or smaller, the inclination angle α being maintained along a distance s of 2 mm or more and 20 mm or less.

Here, the straight line a refers to a straight line connecting the tread end TE and the outermost end in the tire width direction of the shoulder circumferential groove 16, and the straight line b refers to a straight line connecting a point p and the tread end TE, the point p being a point where a straight line c passing through an innermost point at the groove bottom of the shoulder circumferential groove 16 in the tire radial direction as being parallel to the straight line a intersects with the buttress portion outer surface 19a. The distance s corresponds to the length of a perpendicular extending from the tread end TE to a straight line d which is perpendicular to the tire equator line CL passing through the outside end of the inclined belt layer 13a in the tire width direction. The straight line e refers to a straight line connecting the tread end TE to a boundary q between the buttress portion 19 and the sidewall 20.

In the buttress portion 19 configured to have an inclined plane structure as described above, the range of the distance s is constituted of a so-called precipitous inclined plane, rather than of a plane inclined at a large angle from the outside to the inside in the tire radial direction.

Further, the perpendicular extending from the outside end of the inclined belt layer 13a in the tire width direction to the straight line b is configured to have a distance t of 10 mm or more and 20 mm or less. That is, the shortest distance between the inclined belt layer 13a having a largest belt width and the buttress portion outer surface 19a is provided as 10 mm or more and 20 mm or less.

Furthermore, a distance between a straight line f passing through the tread end TE as being parallel to the tire equator line CL and the outside end of the belt reinforcing layer 12 in the tire width direction, that is, a distance u from the tread end TE to the belt end portion of the belt reinforcing layer 12 is provided as 0 mm or more and 25 mm or less and preferably 5 mm to 10 mm. Here, the distance u is measured from the belt end portion of the belt reinforcing layer 12 toward the outside in the tire width direction.

The interlayer rubber 14 is not limited to be formed in the aforementioned wedge-shape in section, and may be formed to have a triangular section.

Figure 3:
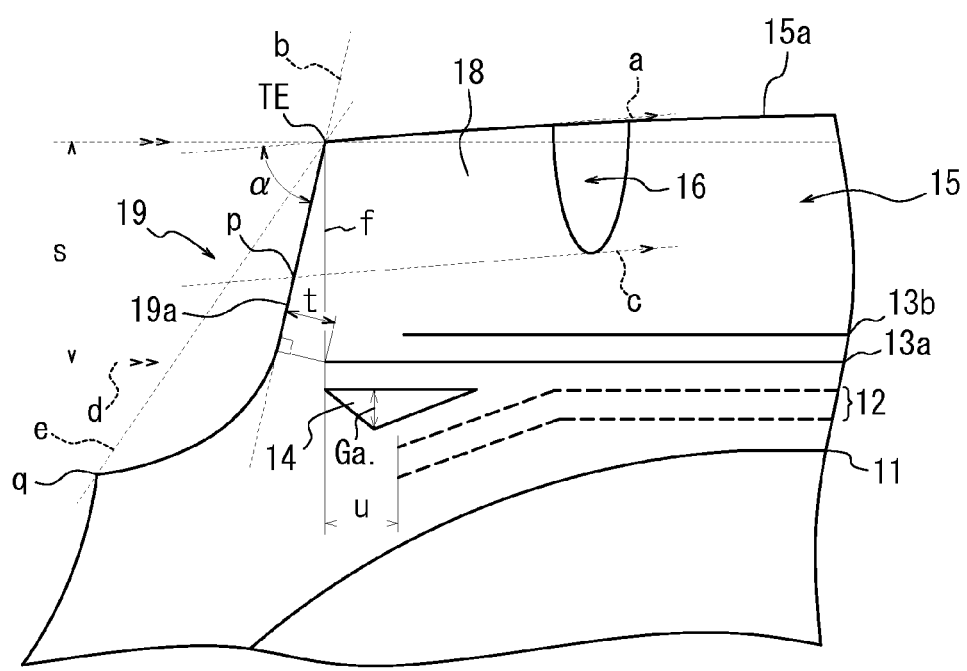
FIG. 3 is a sectional view similar to FIG. 2, illustrating another example of an interlayer rubber.

FIG. 3 is a sectional view similar to FIG. 2, illustrating another example of the interlayer rubber. As illustrated in FIG. 3, the interlayer rubber 14 is formed to have a substantially triangular section convexed downward on the belt reinforcing layer 12 side, that is, on the inside in the tire radial direction, the substantially triangular section being defined by an inclined plane having an interlayer thickness (gauge: Ga.) increasing from the center side to the end side in the tire width direction and by an inclined plane having an interlayer thickness (gauge: Ga.) increasing from the end side to the center side in the tire width direction, so as to ensure that the belt reinforcing layer 12 is provided with a maximum interlayer thickness (interlayer thickness at the belt outside end portion) of at least 3.0 mm.

This case is further preferred because the maximum interlayer thickness of the belt reinforcing layer 12 is defined by a distance from the bottom side to the apex of a triangular shape, which can prevent air trapping during manufacture.

The pneumatic tire 10 with the aforementioned configuration includes: the belt reinforcing layer 12 having a proper belt width; the inclined belt layers 13a, 13b disposed adjacent to the belt reinforcing layer 12; and the buttress portion 19 having a proper shape, to thereby allow for proper handling of tread separation failure which is to be generated when the belt reinforcing layer 12 is increased in width and for suppression of partial wear to be generated due to side force (SF) imparted thereto when the tire is mounted onto a steering wheel.

The belt reinforcing layer 12 is configured to have a belt width that accounts for 70% or more and 95% or less of the tire width, for the following reasons. That is, when the belt width is less than 70% of the tire width, the tread 15 has a non-uniform contact pressure distribution on the surface thereof, leading to partial wear of the tread 15 on the outside in the tire width direction where no belt reinforcing layer 12 is present, with the result that the tire expires before the tread 15 is completely worn out. In particular, the belt reinforcing layer 12 needs to have a large belt width in a tire having a low tire profile.

However, the belt reinforcing layer 12 with a large belt width is susceptible to a large interlayer shear distortion to occur in the belt end portion of the belt reinforcing layer 12 due to tire deformation generated when the tire is brought into contact with the ground under load. In view of this, when the belt reinforcing layer 12 has a belt width that accounts for 70% or larger of the tire width, the belt reinforcing layer 12 needs to have an interlayer thickness of at least 3.0 mm at the belt end portion while the interlayer rubber 14 needs to be low in modulus. Preferably, the interlayer rubber has 100% extension modulus of 5.0 MPa or less at 25° C. measured by a method conforming to JIS K6251 standard.

The inclined belt layers disposed on the outside in the tire width direction of the belt reinforcing layer 12 has two or more layers (inclined belt layers 13a, 13b), and the inclined belt layer 13a disposed adjacent to the belt reinforcing layer 12 is larger in belt width than the belt reinforcing layer 12 by at least 5 mm, preferably by at least 10 mm, to thereby provide excellent wear resistance. Further, the inclined belt layer 13b lying on the outside in the tire radial direction of the inclined belt layer 13a as being adjacent thereto is disposed to intersect with the inclined belt layer 13a, so as to provide a function of uniformizing the deformation in the tire circumferential direction on a surface of the tread 15. When the deformation is more uniformized, the wear of the tread rubber is also uniformized evenly, which allows the tire to be fully used until the tread 15 is completely worn out.

Further, the inclined belt layers 13a, 13b are formed at an angle of 40 degrees or more and 60 degrees or less relative to the tread circumferential direction for the following reasons. That is, when the inclination angle is 40 degrees or more, the tire can have wear performance as well as durability performance at the same time, and thus, the inclination angle is preferably 50 degrees or more. When the inclination angle is less than 40 degrees, a shear distortion may occur between the inclined belt layer 13a and the belt reinforcing layer 12 adjacent thereto, resulting from deformation generated when the tire under load comes into contact with the ground, which may likely cause a failure at an early stage in some circumstances. On the other hand, when the inclination angle exceeds 60 degrees, a large compression strain is applied to the intersecting layers when placed under load, leading to a fracture of the steel cord.

Further, the inclined belt layer 13b is disposed so as to have the belt end thereof arranged inside in the tire width direction than the belt end of the inclined belt layer 13a by at least 5 mm and preferably by at least 10 mm. When the belt end of the inclined belt layer 13b is spaced apart from the belt end of the inclined belt layer 13a by more than 30 mm, the partial wear performance of the tread 15 is impaired. Thus, the belt end of the inclined belt layer 13b is disposed on the inside in the tire width direction relative to the belt end of the inclined belt layer 13a by 30 mm or less. The reason is that the belt reinforcing layer 12 having tensional force is disposed across a wide area in a tire having the belt structure configured as described above and strongly presses the tread 15 when the tire comes into contact with the ground under load, which increases the contact pressure at the tread end TE.

Meanwhile, a pneumatic tire mounted onto a steering wheel is subjected to side force (SF) generated due to a slip angle imparted thereto. In view of this, it is a common practice to reduce the tread width for the purpose of suppressing the tread wear volume and also to have a buttress portion formed in a shape largely inclined relative to the surface of the tread 15. However, in order to improve the wear performance of the tread 15, the buttress portion may preferably be configured to in a shape with the inclination angle α being increased to fall within a range of, namely, 75 degrees of more and 90 degrees or less, of the buttress portion outer surface 19a.

The reason to make the inclination angle α larger is to increase the contact pressure at the tread end TE, to thereby improve the partial wear resistance of the tread 15. Although the contact pressure at the tread end TE decreases as the inclination angle α becomes smaller, the reduction in contact pressure at the tread end TE can be suppressed as long as the inclination angle α is defined to fall within a range of 75 degrees or more and 90 degrees or less, which makes the tread 15 less susceptible to partial wear.

On the other hand, when the inclination angle α is defined to fall within a range of 75 degrees or more and 90 degrees or less in the aforementioned structure in which the inclined belt layer is increased in belt width, the distance between the buttress portion outer surface 19a and the belt ends of the inclined belt layers 13a, 13b becomes smaller, leading to a fear that the belt end portion may penetrate the buttress portion due to distortion occurring in the belt end portion when the tire is placed under load.

In light thereof, the buttress portion needs to be in a shape capable of ensuring durability while maintaining the inclination angle α, and thus the buttress portion is configured to have the inclination angle α retained over the distance s that is 2 mm or more and 20 mm or less. In order to provide an effect of making the tread rubber 15 less susceptible to partial wear, the distance s needs to be at least 2 mm. Further, in order to prevent the buttress portion from being penetrated by the belt ends of the inclined belt layers 13a, 13b, the distance s needs to be 20 mm or less.

In other words, the amount of the tread rubber in the buttress portion 19 may be reduced without changing the position of the tread portion TE (so as to be in the same position as in the conventional one), so that the buttress portion 19 has an smaller compressive elasticity modulus than the conventional one on the outside in the tire width direction beyond the belt end portion of the belt reinforcing layer 12, to thereby increase the amount of deformation in the tire circumferential direction on the surface of the tread 15, which suppresses generation of partial wear. An excessively large inclination angle α fails to ensure a rubber gauge at the belt end portion of the inclined belt layer 13a having a largest belt width. On the other hand, an excessively small inclination angle α fails to reduce the compressive elasticity modulus of the tread.

Further, the minimal distance between the inclined belt layer 13a having a largest belt width and the outer surface 19a of the buttress portion is defined to be 10 mm or more and 20 mm or less for the following reasons. That is, a sufficient rubber gauge needs to be ensured at the belt end portion of the incline belt layer 13a that is closest to the buttress portion outer surface 19a, in order to prevent failure from being generated in the belt end portion and to suppress the generated failure from being propagated, whereas the rubber gauge should not be increased to excess because otherwise it fails to reduce the compressive elasticity modulus, and thus the distance needs to be defined to fall within the aforementioned range in order to ensure a necessary rubber gauge while making smaller the compressive elasticity modulus.

Furthermore, the distance u from the tread end TE to the belt end portion of the belt reinforcing layer 12 is defined to fall within a range of 0 mm or more and 25 mm or less for the following reasons. That is, in the tire width direction, the contact pressure is high in a region where the belt reinforcing layer 12 is disposed while the contact pressure is low in an area outside in the tire width direction beyond the belt end portion of the belt reinforcing layer, which leads to generation of partial wear in the tread shoulder land portion 18. Here, if the distance from the belt end portion of the belt reinforcing layer 12 to the tread end TE is excessively large, the compressive elasticity modulus cannot be reduced, while if the distance is excessively small, a sufficient distance cannot be ensured between the belt end portion of the inclined belt layer 13a having a largest belt width and the buttress portion outer surface 19a.

The aforementioned pneumatic tire 10 was tested for durability and wear performance using a drum tester.

EXAMPLE

Tires in a size of 355/50R22.5 for use in trucks and buses are each assembled to a rim in a size of 11.75×22.5 to be filled to an air pressure (internal pressure) of 900 kPa, and subjected, as Conventional Example, Comparative Example 1, Comparative Example 2, and Examples 1 to 8, to durability test and wear test under a normal load of about 39 kN at a drum speed of 65 km/h.

Here, Conventional Example, and Comparative Examples 1 and 2 each have a buttress portion defined by a straight line connecting the tread end TE and the boundary q with the sidewall 20, rather than in a concave shape, while Examples 1 to 8 each have a buttress portion in a concave shape, that is, in a shape in which the tread end TE and the boundary q with the sidewall 20 are connected to each other by a concave curve.

In the durability test, a driving distance was measured before the tread separation failure occurred. In the wear test, the amount of wear in the tread was measured after the tire was drum-driven for a certain period of time under a normal load.

The results thus obtained are shown in Tables 1 to 3 together with specifications. Referring the items in Tables 1 to 3, the "Width Difference 1" refers to a difference in belt width between the first angled belt layer and the belt reinforcing layer (obtained by subtracting the belt width of the belt reinforcing layer from the belt width of the first angled belt layer), and the "Width Difference 2" refers to a difference in belt width between the first angled belt layer and the second angled belt layer (obtained by subtracting the belt width of the second angled belt layer from the belt width of the first angled belt layer). Similarly, the "Ratio" of the "Belt Reinforcing Layer" refers to a ratio of the belt width of the belt reinforcing layer with respect to the tire width, and the "End Portion Gauge" of the "Interlayer Rubber" refers to an interlayer thickness at the belt end portion of the belt reinforcing layer. As to the angle, "R50" refers to a positive (top right) inclination angle of 50 degrees, while "L50" refers to a negative (top left) inclination angle of 50 degrees.

Further, as to the "Durable Distance", a higher index value shows that the result is more excellent, and as to the "Wear Amount", a lower index value shows that the result is more excellent.

TABLE 1

|  |  | Conventional Example | Comparative Example 1 | Comparative Example 2 |
|---|---|---|---|---|
| Tire Width [mm] |  | 355 | 355 | 355 |
| Belt Reinforcing Layer | Angle [deg.] | 90 | 90 | 90 |
|  | Width [mm] | 240 | 270 | 270 |
|  | Cord Type | waved | waved | waved |
|  | Ratio [%] | 68 | 76 | 76 |
| First Angled Belt Layer | Inclination Angle [deg.] | R50 | R50 | R50 |
|  | Width [mm] | 290 | 290 | 290 |
|  | Width Difference 1 [mm] | 50 | 20 | 20 |
| Second Angled Belt Layer | Inclination Angle [deg.] | L50 | L50 | L50 |
|  | Width [mm] | 135 | 135 | 270 |
|  | Width Difference 2 [mm] | 155 | 155 | 20 |
| Interlayer Rubber | End Portion Gauge [mm] | 2.0 | 2.0 | 2.0 |
|  | Mod. [Mpa] | 6.5 | 6.5 | 6.5 |
| Buttress Shape |  | linear | linear | linear |
|  | Angle [deg.] | 65 | 65 | 65 |
|  | Thickness [mm] | 10 | 10 | 10 |
| Durable Distance | INDEX | 100 | 95 | 90 |
| Wear Amount | INDEX | 100 | 98 | 96 |

TABLE 2

|  |  | Example 1 | Example 2 | Example 3 | Example 4 |
|---|---|---|---|---|---|
| Tire Width [mm] |  | 355 | 355 | 355 | 355 |
| Belt Reinforcing Layer 12 | Angle [deg.] | 90 | 90 | 90 | 90 |
|  | Width [mm] | 270 | 270 | 270 | 270 |
|  | Cord Type | waved | waved | waved | waved |
|  | Ratio [%] | 76 | 76 | 76 | 76 |
| First Angled Belt Layer | Inclination Angle [deg.] | R50 | R50 | R50 | R50 |
|  | Width [mm] | 290 | 290 | 290 | 290 |
|  | Width Difference 1 [mm] | 20 | 20 | 20 | 20 |
| Second Angled Belt Layer | Inclination Angle [deg.] | L50 | L50 | L50 | L50 |
|  | Width [mm] | 270 | 270 | 270 | 270 |
|  | Width Difference 2 [mm] | 20 | 20 | 20 | 20 |
| Interlayer Rubber | End Portion Gauge [mm] | 3.5 | 5.0 | 5.0 | 5.0 |
|  | Mod. [Mpa] | 4.0 | 4.0 | 1.8 | 1.8 |
| Buttress Shape |  | concaved | concaved | concaved | concaved |
|  | Angle [deg.] | 75 | 75 | 75 | 80 |
|  | Thickness [mm] | 10 | 10 | 10 | 10 |
| Durable Distance | INDEX | 105 | 110 | 120 | 120 |
| Wear Amount | INDEX | 94 | 94 | 94 | 90 |

TABLE 3

|  |  | Example 5 | Example 6 | Example 7 | Example 8 |
|---|---|---|---|---|---|
| Tire Width [mm] |  | 355 | 355 | 355 | 355 |
| Belt Reinforcing Layer 12 | Angle [deg.] | 90 | 90 | 90 | 90 |
|  | Width [mm] | 270 | 270 | 270 | 270 |
|  | Cord Type | Waved | Waved | Waved | Waved |
|  | Ratio [%] | 76 | 76 | 76 | 76 |
| First Angled Belt Layer | Inclination Angle [deg.] | R50 | R50 | R50 | R50 |
|  | Width [mm] | 280 | 280 | 290 | 290 |
|  | Width Difference 1 [mm] | 10 | 10 | 20 | 20 |
| Second Angled Belt Layer | Inclination Angle [deg.] | L50 | L50 | L50 | L50 |
|  | Width [mm] | 270 | 270 | 270 | 270 |
|  | Width Difference 2 [mm] | 10 | 10 | 20 | 20 |

TABLE 3-continued

|  |  | Example 5 | Example 6 | Example 7 | Example 8 |
|---|---|---|---|---|---|
| Interlayer Rubber | End Portion Gauge [mm] | 5.0 | 5.0 | 5.0 | 5.0 |
|  | Mod. [Mpa] | 1.8 | 1.8 | 1.8 | 1.8 |
| Buttress Shape |  | concaved | concaved | concaved | concaved |
|  | Angle [deg.] | 75 | 75 | 75 | 90 |
|  | Thickness [mm] | 10 | 5 | 15 | 10 |
| Durable Distance | INDEX | 110 | 100 | 115 | 120 |
| Wear Amount | INDEX | 94 | 94 | 94 | 85 |

The test results show that Comparative Examples have the durable distance of 90 and 95 with respect to the durable distance of Conventional Example indexed as 100 (INDEX), while Examples are reliably improved in durable distance as having indices of 105, 110, 120. As to the wear amount, Comparative Examples have indices of 98, 96 relative to Conventional Example indexed as 100 (INDEX), while Examples are reliably improved as having indices of 94, 90. That is, Examples according to the present invention are excellent in durability performance and wear resistance performance.

As described above, the pneumatic tire 10 with the aforementioned configuration has a buttress shape adapted to the belt layer structure including the belt reinforcing layer (circumferential belt layer) and the angled belt layer on the outside in the tire radial direction of the carcass layer, so as to be capable of suppressing partial wear occurring in the tread shoulder while improving tire durability performance, and thus can be used for heavy duty vehicles. In particular, the pneumatic tire of the present invention is useful as a pneumatic tire of a radial structure having a low tire profile, which is to be mounted on a steering shaft.

REFERENCE SIGNS LIST 10 pneumatic tire
11 carcass
12 belt reinforcing layer
13a, 13b inclined belt layer
14 interlayer rubber
15 tread
16, 17a, 17b circumferential groove
18 tread shoulder land portion
19 buttress portion
19a buttress portion outer surface
20 sidewall
CL tire equator line
TE tread end

The invention claimed is:

1. A pneumatic tire comprising: at least one circumferential belt layer disposed on the outside of the carcass in the tire radial direction; at least one inclination belt layer disposed on the outside of the at least one circumferential belt layer in the tire radial direction; and a plurality of tire circumferential grooves disposed on a tread surface on the outside of the at least one inclination belt layer in the tire radial direction, the grooves being spaced apart from one another in the tire width direction,
the at least one circumferential belt layer having a belt width that is 70% or more and 95% or less of the tire maximum width in section in the tire width direction, and having an outside end portion in the tire width direction disposed on the outside in the tire width direction than the tire circumferential groove disposed at the outermost side in the tire width direction, the at least one circumferential belt layer formed of a belt cord that extends at an angle of 5 degrees or less with respect to the tread circumferential direction,
wherein the buttress portion being positioned on the outside of the tread in the tire width direction and connecting the tread surface to a sidewall is formed to have, in cross-section in the tire width direction, an outer surface in a continuous concave shape with a depth shallow enough not to be set into the inside in the tire width direction from the outside end of the tread surface in the tire width direction,
wherein an edge of the tread is disposed further outward in the tire width direction than the outside end of the at least one circumferential belt layer in the tire width direction,
wherein the outer surface of the buttress portion is formed to be in a shape having an inclination angle of 75 degrees or larger and 90 degrees or smaller relative to the tread surface, in cross-section in the tire width direction,
wherein the shortest distance between an inclination belt layer largest in width among the at least one inclination belt layer and the outer surface of the buttress portion is 10 mm or more and 20 mm or less, and
wherein the inclination angle is maintained over a distance of 2 mm or more and 20 mm or less, the distance being the length of a perpendicular extending from the edge of the tread to a straight line perpendicular to a tire equator and passing through an outside end of a largest width inclined belt layer in the tire width direction.

2. The pneumatic tire according to claim 1, wherein a distance between the outside end of the tread surface in the tire width direction and a belt end portion of the at least one circumferential belt layer is more than 0 mm and 25 mm or less.

3. The pneumatic tire according to claim 1, wherein the at least one circumferential belt layer has, at the belt end portion thereof, an interlayer radial thickness of at least 3.0 mm, the interlayer being disposed between the at least one circumferential belt layer and the at least one inclination belt layer.

4. The pneumatic tire according to claim 1, wherein the at least one circumferential belt layer has a belt width that is 76% or more and 95% or less of the tire maximum width in section in the tire width direction.

* * * * *